DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 8

T934,005

COORDINATION CATALYST

James W. Crary, Wilmington, Del., assignor to E. I. du Pont de Nemours and Company, Wilmington, Del.

Continuation of application Ser. No. 381,769, July 23, 1973. This application June 12, 1974, Ser. No. 478,788

Int. Cl. C08f *3/02*

U.S. Cl. 260—88.2

No Drawing. 16 Pages Specification

A process of producing fine particles of thermoplastic polymeric material is disclosed in which a thermoplastic polymeric material and an anionic surfactant are dispersed in a liquid which is not a solvent for said thermoplastic material at a temperature above the melting point of the polymeric material. The dispersion is agitated to form fine molten particles of said polymeric material in said dispersion, and is subsequently rapidly cooled to thereby solidify said particles of polymeric material and prevent agglomeration.